Figure 1:
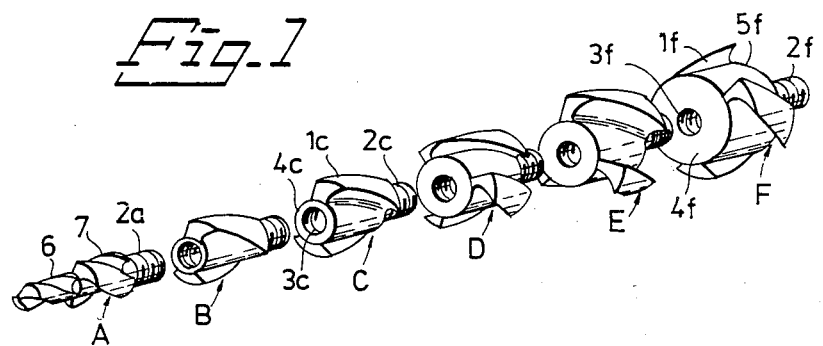

United States Patent [19]

Lindén

[11] Patent Number: 4,561,812
[45] Date of Patent: Dec. 31, 1985

[54] EXTENSIBLE DRILL

[76] Inventor: Karl H. Lindén, Brickebergsv. 38A, S-702 21 Örebro, Sweden

[21] Appl. No.: 511,164

[22] PCT Filed: Oct. 11, 1982

[86] PCT No.: PCT/SE82/00327
§ 371 Date: Jun. 9, 1983
§ 102(e) Date: Jun. 9, 1983

[87] PCT Pub. No.: WO83/01215
PCT Pub. Date: Apr. 14, 1983

[30] Foreign Application Priority Data

Oct. 12, 1981 [SE] Sweden ............................ 8106030

[51] Int. Cl.[4] ........................................... B23B 51/08
[52] U.S. Cl. ................................. 408/225; 408/201; 408/203
[58] Field of Search ............... 408/199, 200, 201, 203, 408/223, 225, 228, 229, 713, 224, 188, 230, 233, 206, 231, 238, 239 R, 241 R, 226

[56] References Cited

U.S. PATENT DOCUMENTS

| 1,620,536 | 3/1927 | Gairing | 408/225 |
| 1,643,679 | 9/1927 | Roderick | 408/223 X |
| 1,747,117 | 2/1930 | Klein | 408/223 X |
| 1,819,949 | 8/1931 | Doehring | 408/191 |
| 2,897,696 | 8/1959 | Tisserant | 408/224 |
| 3,153,356 | 10/1964 | Dearborn | 408/224 |
| 3,712,753 | 1/1973 | Manzi | 408/224 |
| 3,758,222 | 9/1973 | Oakes | 408/224 |

FOREIGN PATENT DOCUMENTS

| 429247 | 8/1926 | Fed. Rep. of Germany | 408/223 |
| 1014236 | 8/1952 | France | 408/200 |
| 1368270 | 9/1974 | United Kingdom | 408/201 |

Primary Examiner—Gil Weidenfeld
Assistant Examiner—Glenn L. Webb
Attorney, Agent, or Firm—Bacon & Thomas

[57] ABSTRACT

An extensible drill assembly comprising a plurality of separate drill members having different drill diameters which are arranged to permit assembly of two or more of the drill members into a continuous drill combination having a stepwise increasing diameter from the outermost drill member.

8 Claims, 4 Drawing Figures

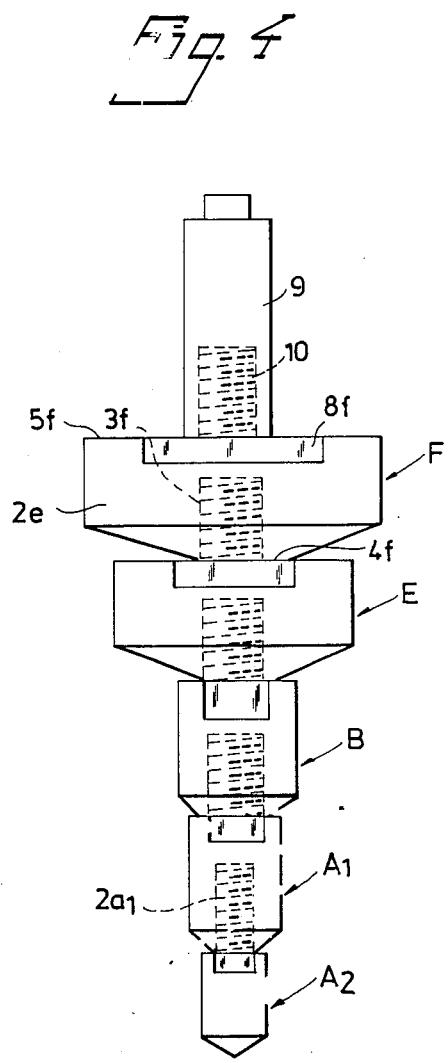

EXTENSIBLE DRILL

The present invention relates to a novel type of drill, particularly for use in the sheet metal and manufacturing industry, which is of the kind that permits drilling of several aperture dimensions with the same drilling unit.

Certain drilling operations, such as, for example, the drilling of sheet metal panels, such as radio and TV chassis, instrument panels and the like, usually requires holes of various dimensions to be drilled in the same plate. To avoid changing drills for each hole dimension, cone-shaped drill bodies have been proposed which comprise a series of cylindrical sections having a stepwise increasing diameter from the narrow end of the drill body. With such a drill holes having diameters corresponding to the dimensions of the stepwise arranged drill sections of the drill body may be drilled by simply successively drilling a step-by-step larger hole until the desired hole size has been achieved. Drills of this type are, for example, described in the U.S. Pat. Nos. 2,897,696, 3,564,945 and 3,758,222.

These drills have, however, several limitations and disadvantages. Thus, only thin materials, such as thin sheet metal and the like, can be drilled, since the drill body will be unreasonably long if each section is made longer and it in addition shall contain a sufficient number of diameters.

Further, when cutting a larger hole it is necessary to drill through the workpiece with all the underlying drill diameters of the drill, which will be more time-consuming than to conventionally prebore with a smaller drill and then change to a wider drill corresponding to the desired hole dimension. Moreover, the drill body will essentially be unusable, if any of the drill sections is damaged.

According to the invention there is suggested a drill utilizing the advantages of the above described combination drill, i.e. that several hole dimensions can be bored without any exchange of drills, but which lacks the mentioned disadvantages and limitations. This is achieved with a drill of extensible type, comprising a plurality of separate drill members of mutually different drill diameters, which can be put together in any desired combination into a continuous drill body of two or more of the drill members having a stepwise increasing diameter from the outermost drill member. When a number of holes of varying dimensions are to be drilled in, for example, a sheet metal panel, the drill members corresponding to the desired hole sizes are selected and assembled into a continuous drill body, which is then mounted in the drilling machine, generally by means of a mounting adapter in the form of a chuck shaft or the like. A drill is thus provided which is particularly adapted to precisely the hole dimensions to be drilled and consequently contains no unnecessary drill sections. As a result thereof the length of each drill section can be made considerably greater than in the previously known fixed combination drill according to the above U.S. patents without the total drill body becoming unreasonably long for a moderate number of hole sizes. This means in turn that it is possible to drill considerably thicker materials, so that the combinable drill of the invention to a substantial extent can replace conventional fixed drills. Further, one may proceed directly from a small hole to a larger hole without having to drill through the workpiece with all the intermediate drill dimensions as with the fixed combination drill. If any one of the drill members should be damaged, it will only be necessary to replace that very member, while a fixed combination drill as above must be considered as substantially unusable when any one of the drill sections has been damaged.

The attachment of the drill members to each other can be made in various ways, but a suitable embodiment is to make the drill members screwable on to each other by screwing of a central thread tap of a drill member into a corresponding threaded axial central recess of the adjacent drill member. Preferably, the thread taps are arranged on the top part of the drill members. To render a simple assembly and disassembly of the drill members possible, each drill member is provided with suitable means for the application of a tool, such as a wrench grip.

Optionally one or more drill members of cutter type may be included in the drill set for plane countersinking for washer seats or the like. Suitably the last drill of the drill ladder may be such a cutter member.

The above described extensible drill of the invention has great utility within the sheet metal and manufacturing industry, where very time-consuming work can be saved. The inventive concept is, of course, also applicable to other areas and to drilling in other materials. Further, the expression "drill member" is also to be considered as comprising comparable cutter tools and the like.

Figure 2:
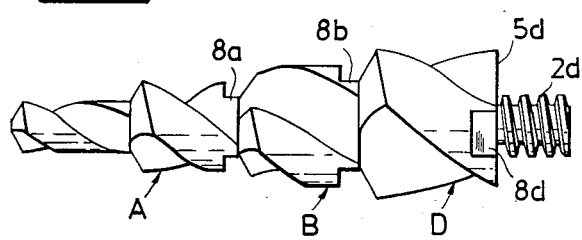
Figure 3:
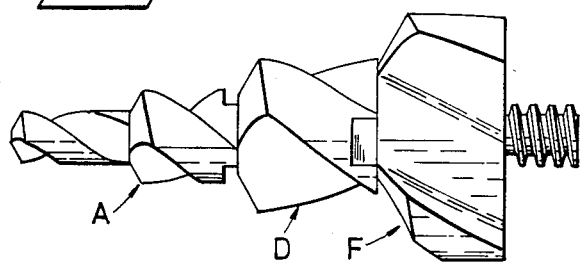

In the following an example of an embodiment of the invention will be described in connection with the accompanying drawings, wherein FIG. 1 is a perspective view of a set of separate, combinable drill members of the invention, FIG. 2 is a side-elevation of a drill consisting of a combination of drill members of FIG. 1, FIG. 3 is a side-elevation of another combination of drill members of FIG. 1, and FIG. 4 is a schematical side-elevation, partially transparent, of still another combination of drill members corresponding to FIG. 1 and adapted for mounting in a drill chuck.

FIG. 1 shows six drill members designated by the letters A–F having stepwise increasing drill diameters in said order. Each drill member A–F comprises a cutting portion with cutting edges 1 and a mounting portion in the form of a central thread tap 2 projecting from the upper part of the cutting portion. In their lower part the drill members are provided with a threaded axial central recess 3 arranged to receive the thread tap 2 of another drill member. The lower part of the drill members are terminated by a plane end portion 4. The cutting portion of the drill members are terminated by a corresponding plane surface 5, from which the thread tap 2 protrudes. In FIG. 1 the drill member A, or the so-called starting drill, comprises two cutting sections 6 and 7 having different diameters. The drill member A may, of course, also be made as two separate drill members, as is shown in FIG. 4 ($A_1$, $A_2$). The number of cutting edges on the drill members naturally vary with their diameters, and it may be suitable to have two cutting edges on the thinner drill members and three to four on the thicker ones. In the FIG., for example, the drill members A–C are illustrated as having two cutting edges, while the drill members D–F have three cutting edges. Of course, both the shape and number of the cutting edges may be varied. As best appears from FIGS. 2–4, the drill members A–F are further provided with wrench grip 8 in the upper part of the cutting portion to facilitate the assembly and disassembly, respectively, of the drill members, as will be described in more detail below.

The drill members A–F in FIG. 1 may be combined with each other in arbitrary manner, the starting drill A, however, always being used as the outermost drill member. Two drill members A–F are assembled by screwing the thread tap 2 of one drill member into the threaded recess 3 of the succeeding drill member in the desired combination. The threaded recess 3 is somewhat deeper than the length of the thread tap, so that when two drill members have been screwed together the lower end face 4 of one drill member contacts the upper end face 5 of the other. In FIGS. 2–4 examples of various combinations of drill members A–F in FIG. 1 are shown. Thus, in FIG. 2 the drill members A, B and D are combined, while the drill body of FIG. 3 comprises the drill members A, D och F. In FIG. 4, finally, the drill members $A_1$, $A_2$ (corresponding to A in FIG. 1), B, E and F are included. In FIG. 4, as mentioned above, the starting drill consists of two separate drill sections $A_1$ and $A_2$, which make it possible to change the dimension of the proper starting drill $A_1$. Due to the thin dimension of the drill member $A_1$ its thread tap $2a_1$ must usually be made narrow. The other thread taps 2, as well as the recesses 3, otherwise have the same dimension to render the combinableness of the invention possible. The wrench grips 8, which suitably may consist of two opposed chamfered portions in the upper part of the drill members, facilitate the assembly and in particular, the disassembly of the drill members.

The extensible drill of the invention may be used in hand drilling machines as well as column and radial drilling machines. To fix the desired combination of drill members A–F in the drilling machine in question, a drill or chuck fastener 9, which in one end thereof is provided with a threaded, axial recess 10, is screwed onto the top drill member, i.e. the one having the largest dimension. The shape of the drill or chuck fastener 9 is adapted to the fastening device or chuck of the drill machine and may, for example, for fixing in a column drilling machine be tapered. The length of the drill or chuck fastener is also determined by the hole depth to be drilled, i.e. the thickness of the workpiece to be drilled. Suitably drill or chuck fasteners 9 of varying length are provided in the drill set.

Optionally one or more drill members designed as drill steels or cutter means for plane countersinking, e.g. for washer seats, may be included in a drill set according to the invention. Suitably, the last drill member, i.e. of the largest diameter, in a drill ladder A–F may be designed for such plane countersinking.

The dimensions of the drill members in the extensible drill ladder of the invention may be varied to suit various needs. For various works within the sheet metal and manufacturing industry, for example, a starting drill of about 4–10 mm (depending on whether a hand drilling machine or a fixed drilling machine is to be used) may be suitable, the other drill members having a stepwise increasing diameter of up to about 80–100 mm.

When, for example, a hole of a large diameter is to be drilled in a plate or a beam, say with a dimension corresponding to the drill member E of FIG. 1, the starting drill A and the drill member E are screwed together, the chuck fastener 9 is fixed to the drill member E and the chuck fastener is fixed in the drilling machine chuck. The hole is then bored with the starting drill A (which is done in two steps with the drill sections 6 and 7) and the drilling is then directly continued with the drill E. To drill a corresponding hole in conventional manner it is necessary to first prebore with a smaller drill and then change to the drill having the larger drill dimension. When it, for example, is a question of wider drills than about 15 mm, it may be necessary to also exchange the chuck therebetween. Through the extensible drill of the invention this timeconsuming procedure is thus completely obviated and the drilling can be carried out in one single moment. When several hole sizes are to be bored in one and the same plate, the saving of time by not having to exchange chucks and drills will be even greater. In such a case the drill members in the drill ladder A–F giving the desired hole dimensions are selected and screwed together into a continous drill bit having a step-by-step increasing drill diameter, e.g. the combination A, D, F according to FIG. 3. After that the chuck fastener 9 is screwed on to the drill member F as above and the whole unit is fixed in the drilling machine. Each hole is then gradually bored to the desired size by successive through-boring with the drill members A, D, F until the desired hole size has been achieved. When necessary, the whole drill ladder may be assembled, which in the shown case permits seven different hole diameters.

The drill sets for the extensible drill according to the invention may, of course, contain more than the six drill members A–F according to FIG. 1. Further, the length of each drill member may be varied depending on the material thickness to be worked. The number of drill members that may be included in a drill ladder will then, of course, be correspondingly restricted, as such a drill ladder otherwise would become too long. Also, other drill members than the starting drill A may comprise a fixed combination of cutting sections having different diameters, although in such a case the flexibility of that extensible drill will be reduced correspondingly.

The invention is, of course, not restricted to the above specifically shown and described embodiments, but many variations and modifications may be made within the scope of the general inventive concept, as stated in the subsequent claims. This especially concerns the design of the cuts of the drill members as well as the design of the coupling means for assembly the various drill members.

I claim:

1. An extensible drill assembly for drilling holes of different diameters with the same assembly comprising:
   (a) a front drill member;
   (b) a plurality of rear drill members having different drill diameters;
   (c) the front drill member including at least one cutting portion extending peripherally and axially thereof and means for detachably connecting the front drill member to one or more rear drill members;
   (d) each rear drill member including first means for detachably connecting one end thereof to either the front drill member or another rear drill member and second means for detachably connecting the other end thereof to either a drilling machine or another rear drill member, whereby the first and second detachable connection means permit the rear drill members to be connected to each other in any desired number and combination; and (e) the connected drill members being of stepwise increasing diameters from the front drill member to the last rear drill member.

2. The drill assembly of claim 1 wherein:
(a) the means for connecting the front drill member to one or more rear drill members includes a threaded tap;
(b) the first detachable connection means of each rear drill member includes a threaded recess; and
(c) the second detachable connection means of each rear drill member includes a threaded tap.

3. The drill assembly of claim 1 wherein the front drill member includes two cutting portions of different diameters.

4. The drill assembly of claim 1 wherein the front drill member and each rear drill member are provided with means engageable by a tool for connecting the drill members together.

5. The drill assembly of claim 1 wherein the rear drill member having the largest drill diameter is configured for plane countersinking.

6. The drill assembly of claim 1 wherein the front and rear drill members each include two to four cutting edges.

7. The drill assembly of claim 1 further including at least one chuck fastener for detachable connection to the second detachable connection means of any of the rear drill members.

8. The drill assembly of claim 7 further including plural chuck fasteners of different lengths.

* * * * *